United States Patent [19]

Demetrescu

[11] 4,040,395
[45] Aug. 9, 1977

[54] ENGINE SELECTIVELY UTILIZING HYBRID THERMODYNAMIC COMBUSTION CYCLES

[76] Inventor: Mihai C. Demetrescu, 17761 Palmento Way, Irvine, Calif. 92715

[21] Appl. No.: 560,672

[22] Filed: Mar. 21, 1975

Related U.S. Application Data

[62] Division of Ser. No. 413,070, Nov. 5, 1973, Pat No. 3,996,915.

[51] Int. Cl.$^2$ .............................................. F02B 3/00
[52] U.S. Cl. ............................ 123/32 EA; 123/198 F
[58] Field of Search ............ 123/198 F, 118, 198 DB, 123/32 EA

[56] References Cited

U.S. PATENT DOCUMENTS

| | | | |
|---|---|---|---|
| 2,771,867 | 11/1956 | Peras | 123/198 F |
| 3,181,520 | 4/1965 | Mock | 123/198 F |
| 3,756,205 | 9/1973 | Frost | 123/198 F |

Primary Examiner—Carroll B. Dority, Jr.
Assistant Examiner—Ronald B. Cox
Attorney, Agent, or Firm—Nilsson, Robbins, Dalgarn & Berliner

[57] ABSTRACT

An engine is disclosed incorporating a block means defining a plurality of cylinder chambers for containing reciprocating pistons that are coupled to provide output drive power. Means are incorporated in the block means for valving the cylinder chambers to provide pumping flow. Additionally, means are provided for selectively burning fuel in said cylinder chambers at variable time intervals in accordance with demands for drive power. A variable number of elemental charges of fuel may be injected and ignited during selected cycles of each cylinder in accordance with the immediate demand for power. Admission of air is unrestricted during the intake strokes to result in combustion with an abundance of air. An initially-lean mixture is compressed and the flame to consume it is generated by spark-ignition of an elemental charge of vaporized fuel which is the last to be injected in the combustion chamber. An electronic digital control system is disclosed which is responsive to a manually-indicated power demand and to motion patterns of the engine to achieve selective injection and subsequent combustion of fuel for efficient and smooth operation of the engine. As disclosed, the engine is embodied in a form similar to conventional internal-combustion engines to stress the ease of construction and of possible conversion of existing engines to the system of the present invention.

6 Claims, 16 Drawing Figures

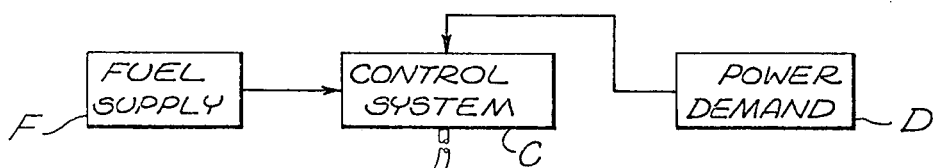
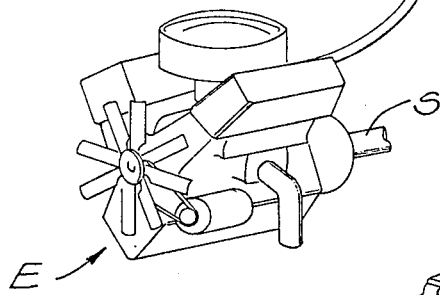
FIG.1.
FIG.2.
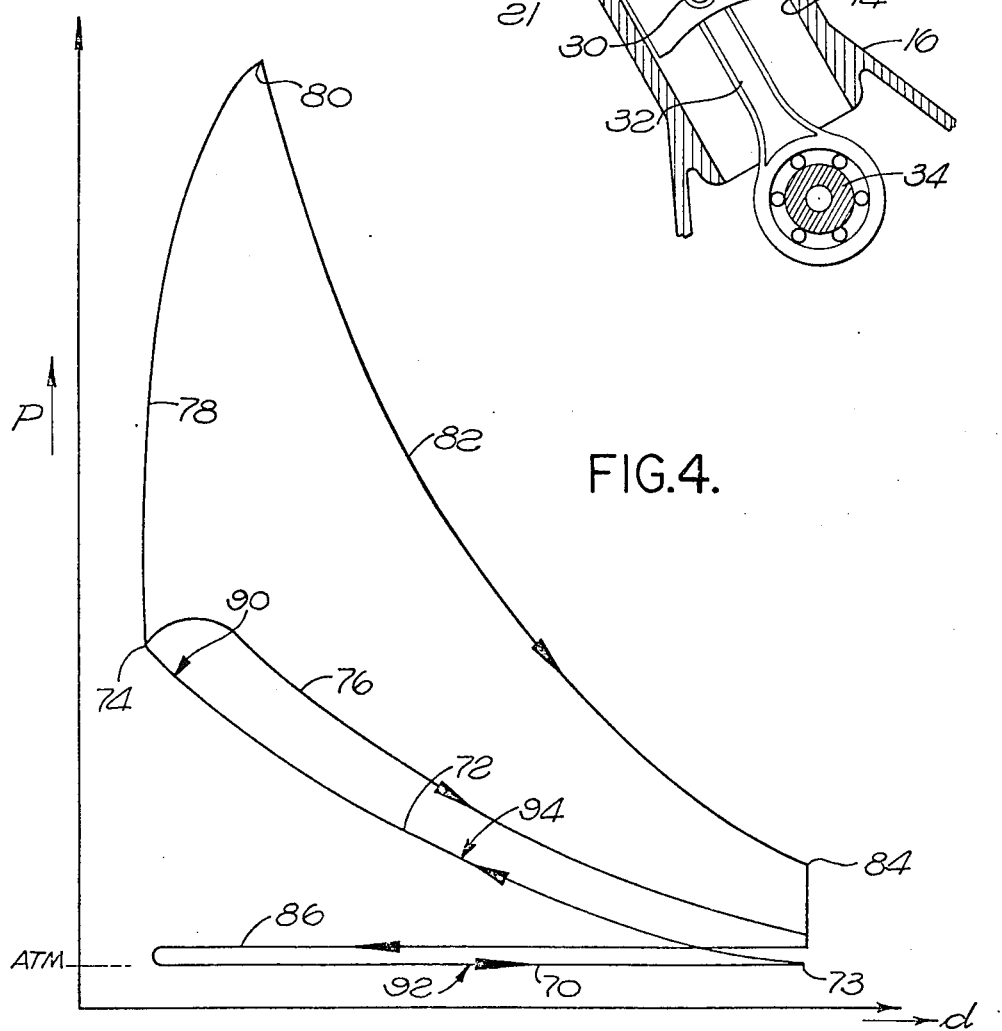
FIG.4.

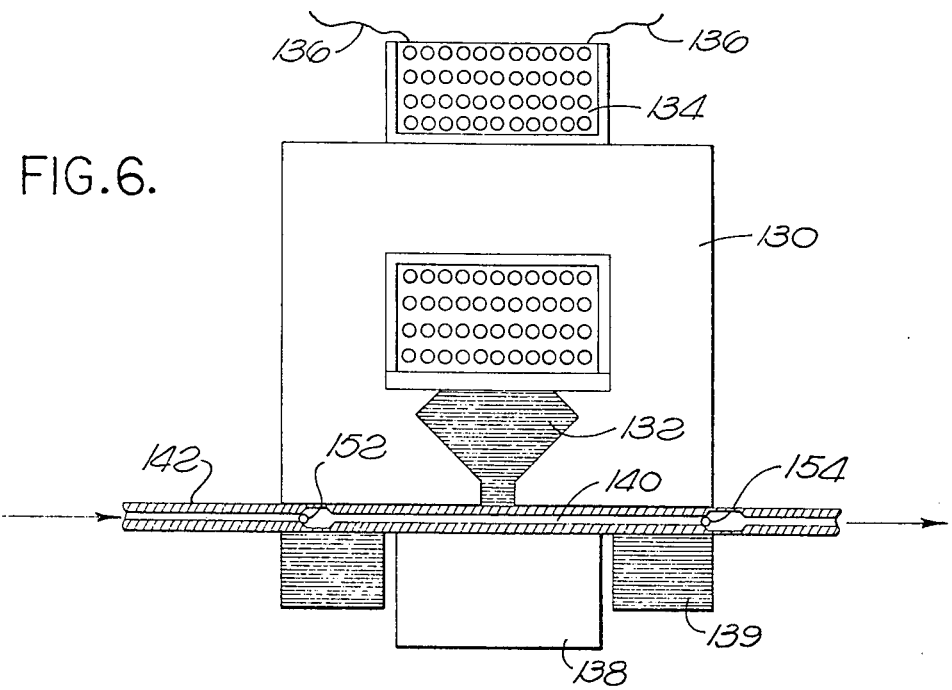
FIG.6.
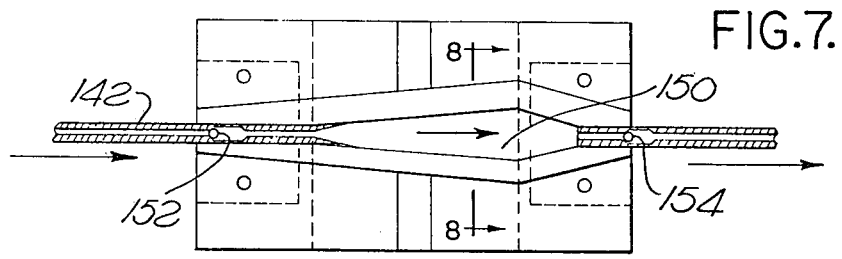
FIG.7.
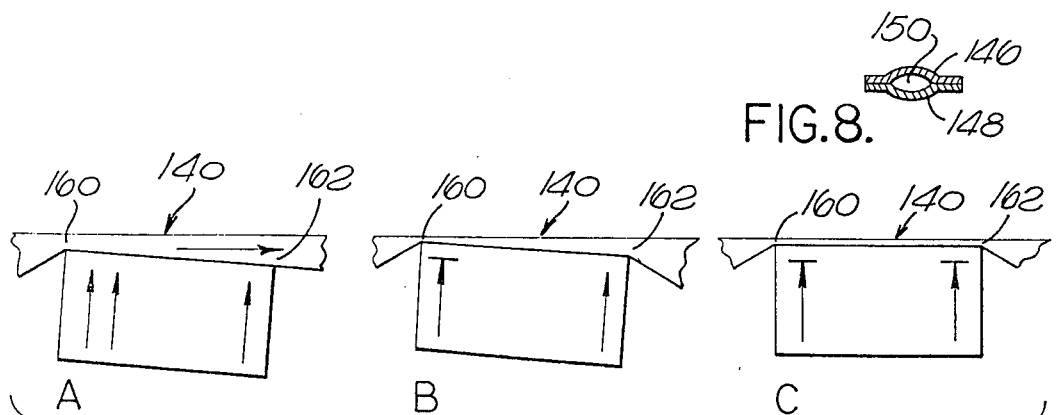
FIG.8.
FIG.9.

ENGINE SELECTIVELY UTILIZING HYBRID THERMODYNAMIC COMBUSTION CYCLES

This is a division of application Ser. No. 413,070, filed Nov. 5, 1973 now U.S. Pat. No. 3,996.915.

BACKGROUND AND SUMMARY OF THE INVENTION

In recent years, there has been a substantial technological effort directed toward the development of an improved engine as for use in automotive vehicles. The primary objectives of the effort have been improved efficiency and reduced pollution. Important secondary considerations for an engine have also been significant including: reduced size, economy of manufacture and relatively-low maintenance requirements.

Although some truly-significant recent advances have been accomplished in the field of fuel engines, a ponderous problem continues in relation to the utilization of existing production facilitates and maintenance knowledge. That is, a prodigious quantity of tooling and machinery exists for the production of conventional internal-combustion engines as used in automotive vehicles. That fact tends to reduce the significance of improved engines that require totally-different tooling and production machinery. Consequently, the primary implemented efforts to reduce the flow of pollutants from internal-combustion engines have involved corrective appliances rather than improved combustion cycles. The result has been a questionable reduction in the emission of pollutants accompanied by a general reduction in engine efficiency and performance. Consequently, in view of the intensifying importance of conserving fuels, such prior efforts are questionable improvements in relation to the total situation.

In general, it is recognized that two forms of internal-combustion engines are relatively low in the production of polluting emissions. These engines are the Diesel and the stratified-charge Otto engine. Generally, Diesel engines tend to be noisy, relatively heavy, relatively expensive, somewhat unstable and although not highly productive of live hydrocarbons and nitrogen oxides, do not produce substantial smoke. With regard to the stratified-charge Otto-cycle engine, the structure is relatively complex and, accordingly, expensive in that a plurality of carburetors must be synchronized. Additionally, the stratified-charge engine sacrifies efficiency due to a decrease in the compression ratio necessitated by the added space or chamber for initiating combustion.

Regardless of the individual considerations pertinent to stratified-charge and Diesel engines, the significant fact is that at present, neither engine may be readily embodied in a form similar to a conventional internal-combustion automotive engine for which vast production facilities and widespread maintenance knowledge currently exist. Engines of the present invention have similarities to Diesel and stratified-charge cycles and may be embodied in forms for production and maintenance by a substantial fragment of existing facilities. That is, the present invention is directed to an improved internal-combustion engine which may be embodied in a for that is capable of manufacture utilizing substantially-conventional production facilitates. The engine of the present invention burns fuel with an abundance of air, control being exercised by metering fuel independent of the air supplied to the engine. More specifically, the engine incorporates a fuel supply system for selectively injecting charges of fuel into the cylinder chamber at variable time intervals and in accordance with the demand for drive power. Each combustion involves a predetermined number of component or elemental fuel charges, which variation also affords a basis for control.

In the operation of an engine in accordance herewith, fuel is injected into cylinder chambers through heated passages which, in the illustrative embodiment, are incorporated in a spark-plug structure which also embodiment, are incorporated in a spark-plug structure which also ignites the fuel charges. Fuel is supplied by the injectors in accordance with current power demand as necessary to: (1) maintain smooth operation of the engine, and (2) satisfy a demand for an output torque. In the disclosed embodiment, a manual control system develops digital control signals for actuating a fuel-control apparatus to inject component charges of fuel. Timely injection of the component fuel charges in relation to ignition accomplishes a relatively clean combustion that occurs substantially in accordance with demand and in an abundance of air.

It is recognized that systems have been previously proposed in which fuel is metered somewhat independent of the air intake to the engine. Such systems have been employed as for starting and controlling engines. Exemplary systems are disclosed in U.S. Pat. Nos. 2,030,086 (Woolson); 2,010,469 (Trienbnigg) and 3,719,176 (Shinoda et al). However, systems in accordance with the present invention wherein component fuel charges are selectively injected responsive to demand, and are effectively burned, are believed to represent a significant improvement.

Part of the subject matter of this disclosure is contained in Disclosure Document No. 019812 filed in the U.S. Pat. Office on June 6, 1973. Also, part of the general principle of electronic digital control of internal combustion engines is included in U.S. Pat. applications Ser. No. 298,824, filed Oct. 19, 1972, and 314,211, filed Dec. 11, 1972.

BRIEF DESCRIPTION OF THE DRAWINGS

The drawings, disclosing an illustrative embodiment of the present invention, and which serve to present the various objectives and advantages hereof, are as follows:

FIG. 1 is a perspective and diagrammatic view of an embodiment of the present invention;

FIG. 2 is a fragmentary vertical sectional view through the engine portion of the system of FIG. 1;

FIG. 4 is a graphic presentation of combustion cycles for the system of FIG. 1;

FIGs. 6 and 7 are sectional views of a component in the system of FIG. 5;

FIG. 8 is an enlarged fragmentary view of the structure of FIG. 6;

FIG. 9 is a series of sectional views illustrative of the operation of the structure of FIG. 7;

DESCRIPTION OF THE ILLUSTRATIVE EMBODIMENT

Figure 3:
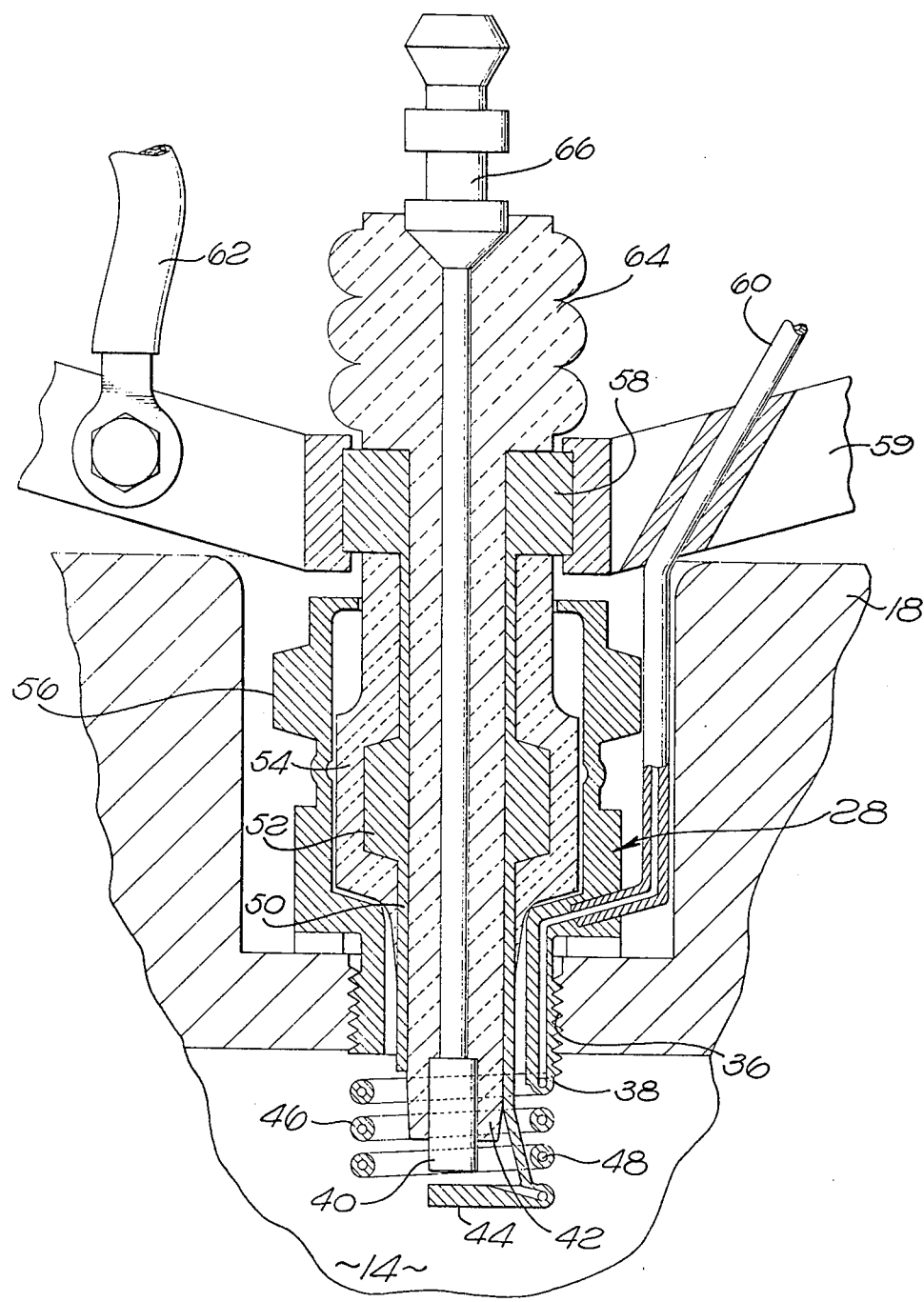
FIG. 3 is an enlarged fragmentary view of the structure illustrated in FIG. 2.

The disclosed embodiment exemplifies the invention which may, of course, be embodied in other forms, some of which may be radically different from the illutrative embodiment. However, the specific structural and functional details disclosed herein are representative and provide the best embodiments of the system as presently known for explaining the system and providing a basis for the claims herein which define the scope of the invention.

Referring initially to FIG. 1, there is a represented an embodiment of the present invention which functions to receive combustible fuel from a supply F and to provide rotary power at a shaft S. The fuel from the supply F passes through a control system C to an engine unit E in which the fuel is burned to provide expanding gases for actuating the engine unit E. In the operation of the engine E, the intake of fresh air is unrestricted. Accordingly, in one operating mode which is somewhat similar to the Diesel cycle, a full charge of air is compressed for each combustion cycle. As a consequence, combustion occurs in an excess of air, and thus oxygen, accordingly avoiding the formation of more serious pollutants, e.g., CO gas.

It is also noteworthy that in the operation of the system are disclosed herein, fuel is vaporized before it is injected into the cylinders. As a consequence, the engine tends to be relatively free of smoke, as tradionally produced by conventional Diesel engines. As still another consideration, the operating mode of the present system whereby a full charge of air is consistently received in the cylinders, reduces the areas within the cylinder which attain intensive heat levels to produce the noxious nitrogen-oxide combinations constituting a serious air pollutant.

As suggested above, in the operation of the engine unit E, a total charge of fuel to be burned during a combustion interval may comprise different numbers of component or elementary charges, each of which includes a fixed amount of fuel. Specifically, the time interval for a power stroke including combustion within a specific cylinder of the engine unit E may occur with: no combustion, combustion of a single elementary charge, or combustion of a plurality of elementary charges. In each instance, combustion in the engine unit E occurs upon the injection of an elementary charge at the end of the compression stroke, which charge is ignited with a spark so as to burn the vaporized fuel as it enters the compressed air, somewhat in the manner of combustion in a Diesel engine. Generally, the thermal efficiency of a cycle utilizing such combustion is a function of the compression ratio [$n = 1-(1/C_r^\gamma)$].

Somewhat-conventional Otto cycle engines generally have a compression ratio around 1:8 to 1:10, which is considerably lower than the compression ratios of conventional Diesel engines, e.g., around 1:15 to 1:20. Consequently, the engine of the illustrated embodiment is somewhat less efficient than a conventional Diesel engine when operation involves the single elementary charge of fuel. However, the mode of operation is employed only for low levels of output power at which thermal efficiency is relatively unimportant.

During operation of the present engine to produce significant output torque at the shaft S, the cycle becomes somewhat similar to a stratified-charge Ottocycle engine. Specifically, a plurality of elementary charges are injected. For example, one elementary charge may be injected during the intake stroke, with another at the beginning of the compression stroke. Consequently, a lean air-fuel ratio, e.g. 30:1, is achieved which would be difficult or impossible to ignite by a spark at relatively-low compression ratios. However, ignition is accomplished as described above, by injecting another, e.g., third, elementary charge at the end of the compression stroke which is ignited immediately by the spark plug and continues to burn as it enters the compressed, lean mixture. Consequently, a flame front is developed which propagates through the cylinder burning the lean mixture somewhat in the manner of a stratified-charge engine. A different aspect of the present engine is that such a mode of operation is readily implemented in an engine utilizing fixed fuel charges.

Furthermore, as indicated above, embodiments of the present engine may be manufactured to incorporate the major components of conventional automotive engines. Additionally, it is to be appreciated that existing conventional automotive engines may be converted to a form of the present invention without excessive modification. In that regard, the engine unit E (FIG. 1) is depicted as a somewhat-conventional V-8 automotive engine. Modifications in accordance with the present invention are not apparent in the figure, however, will be considered in complete detail below.

Referring to FIG. 2, a single piston 12 is illustrated and is exemplary of the pistons in the engine unit E. The piston 12 is contained in a cylinder 14 defined in an engine block 16 and closed by a head 18. An intake passage 20 and an exhaust passage 22 are provided through the head 18. The passage 20 terminates at a port 21 which functions in cooperation with an intake valve 24 while the passage 22 terminates at a port 23 which functions in cooperation with an exhaust valve 26. The inter-coupled synchronized operation of the valve 24 and 26 with reciprocations of the piston 12 to accomplish pumping flow is in accordance with conventional techniques as well known for four-stroke Otto-cycle automotive engines. However, the intake passage 20 is substantially unrestricted with the result that a full charge of air is drawn past the intake valve 24 during each intake stroke. That is, no throttle valve is present to meter fuel-air mixture as in a conventional engine.

Fuel is supplied to the cylinder 14 through an injector-ignition unit 28 which is considered in greater detail below. Functionally, the unit 28 incorporates heated ducts for supplying discrete elementary charges of vaporized fuel. The unit 28 also provides the ignition spart. As indicated above, strokes by the piston 12 may or may not involve combustion and in the event combustion does occur, different predetermined amounts of fuel are burned depending on power demand.

The operation of the piston 12 to provide torque or output power to the shaft S (FIG. 1) is rather conventional. Specifically, the piston 12 (FIG. 2) is coupled by a wrist pin 30 and a connecting rod 32 to a crank shaft 34 which is in turn coupled to the drive shaft S (FIG. 1). The number of pistons in an engine of the present invention, the firing sequence in the cylinders and the structure for transferring or converting the output torque may all be in accordance with existing technology.

Considering the injector-ignition unit 28 in somewhat greater detail, reference will now be made to FIG. 3 for a detailed explanation of the structure and the operation of the unit 28 to inject charges of vaporized fuel and provide an ignition spark. A fragment of the head 18 is illustrated in FIG. 3 defining a threaded port 36 in which the unit 28 is received. Specifically, the threaded port 36 matingly receives a section 38 of the unit 28 so that a portion of the unit 28 extends into the cylinder 14. The components of the units 28 within the cylinder 14 include a high-voltage electrode 40, a ceramic internal insulator 42 and a low-voltage electrode 44.

The low-voltage electrode is integral with a helical extension 46 from the threaded section 38, which extension defines an internal passage 48 for carrying and vaporizing fuel. The beat for vaporization is provided in part by an electrical heating current through the helical extension 46, flowing between the low-voltage electrode 44 and the block 16. A second electrical current path is provided from the high-voltage electrode 40 to the low-voltage electrode 44 to define a spark gap.

Within the unit 28, the low-voltage electrode 44 is integral with a sleeve 50 including an annular ridge 52 for locking engagement with an annular body 54 of insulating material. The insulating body 54 separates the sleeve 50 (physically and electrically) from the external housing 56 of the unit 28, which housing is integral with the threaded section 38. The insulated sleeve 50 is integral with a contact ring 58 that lockingly receives a bracket 59 which supports a fuel line 60 and a cable 62 for supplying electrical energy to the low-voltage electrode 44. On the upper side of the bracket 59, the somewhat-tubular, internal insulator 42 enlarges at a section 64, from which the upper end 66 of the high-voltage electrode 40 emerges to receive a high-voltage-carrying cable as generally well known in the prior art.

In the operation of the engine, as disclosed herein, discrete elementary fuel charges are provided through the fuel line 60 to pass through the resistance-heated extension 46 and emerge as vaporized fuel. The timing (in relation to the cycle) of such injections is considered in detail below; hoever, the last elemental fuel charge (there may be only one, or none) is ignited during injection by a spark which is developed between the electrodes 40 and 44. Thus, the unit 28 effectively serves to inject elemental charges of vaporized fuel and to ignite select charges of such fuel with the application of a high voltage at the upper end 66 of the electrode 40. Considering the timing of fuel injection and the cycle of the engine unit E in somewhat greater detail, reference will now be made to the cylinder-pressure diagram of FIG. 4. In accordance with convention, pressure P is indicated along the ordinate while piston displacement d is indicated along the abscissa. The diagram is descriptive of the exemplary four-stroke engine disclosed herein. Also in accordance with convention, the first stroke is represented by a line 70 and represents the intake stroke of a piston, e.g. piston 23 (FIG. 2). The second stroke (compression) is represented by the continuous line 72, extending from the end 73 of line 70 to a point 74. The third stroke (power) is differently represented, depending upon the specific mode of operation described. In a minimal-power mode of operation, the power stroke is described by the continuous line 76; however, in a full-power mode of operation, the power stroke is described by a line 78 extending to a point 80 and continuing as a line 82 through the point 84. In either event, at the conclusion of the power stroke, the piston performs a fourth or exhaust stroke as described by the line 86 to complete the four-stroke cycle.

In the operation of the engine, each cylinder is independently controlled and as indicated, during each power stroke, several possibilities exist. Specifically, the cylinder may be designated to skip a power stroke in which event no fuel is introduced into the cylinder. Alternatively, the cylinder may be designated for a minimal power stroke in which a single elementary charge of fuel is burned. As another alternative, the cylinder may be designated for a full power stroke in which event several elementary charges of fuel are burned.

In the event that no fuel is introduced into a cylinder during a specific cycle, the piston in that cylinder simply functions to produce a pumping cycle with no fuel-energy conversion. In the event of a minimal power stroke, a sigle elementary charge of fuel is injected near the end of the compression stroke. Specifically, as indicated in FIG. 4, the elementary charge would be injected at an interval generally about the point 90. As indicated above, such a charge is injected in a vapor form from the unit 26 (FIG. 2) and is burned on injection. As a consequence, the pressure in the cylinder is increased somewhat as designated by he continuous line 76 from a point 74 indicating the end of the compression stroke. The low-power or single-charge cycle is thus described by the intake stroke (line 70) as indicated, the compression stroke (line 72), and a power stroke as designated by the continuous line 76 after which an exhaust stroke (line 86) occurs. Thereafter, the next following cycle may involve any of the various alternatives as indicated above.

Reference will continue to be made to FIG. 4 for a consideration of the full-power cycle in which the aggregate or total charge consits of a plurality of elementary charges. The full-power cycle, commanded for individual cylinders in accordance with torque demand, includes the intake or first stroke of the cycle (line 70) and the exhaust or fourth stroke (line 86) just as described above. However, during the intake stroke of a full power cycle, at approximately the point 92, an initial elementary charge of fuel is injected. Another such charge of fuel is injected at approximately the point 94. There two fuel charges become intimately mixed as a lean phase that is not generally capable of ignition by a spark. However, at about the point 90, another elementary fuel charge is injected which is ignited during the injection. Consequently, as indicated above, a flame front is formed with a burning pattern somewhat similar to that of a stratified-charge engine. Therefore, from the point 74, terminating the compression stroke, the gaseous products from the combustion develop a pressure increase as indicated by the continuous line 78 extending to the point 80 at which the combustion is completed. Thereafter, the power stroke is completed as indicated by the continuous line 82. Of couse, at the end of the power stroke (point 84) the cycle returns to the exhaust stroke in the pattern as indicated by the line 86.

In summary, it may be seen that each cycle in a cylinder may involve: (1) no fuel consumption, nor effective power stroke; (2) a single elementary charge of fuel consumption with a minimal power stroke; or (3) a plurality of elementary charges of fuel being consumed to provide a major power stroke. Of course, in a cycle involving no combustion, no pollutants are developed. A cycle involving a minimal power stroke involves burning vaporized fuel upon injection in an abundance of air. As a consequence, combustion tends to be complete thereby avoiding the discharges of live hydrocarbons, or other noxious gases, as well as smoke. In the full-power cycle, the combustion as indicated above moves from a rich fuel mixture through a very-lean fuel mixture with the result that combustion is again substantially complete thereby minimizing the discharge of pollutants.

On the basis of prior research work, it is apparent that a very clean combustion can be obtained with hydrocarbons (such as gasoline) which have been chemico-physically cracked prior to their ignition in the cylinder of a conventional engine. As is well known, the cracking process utilizes high pressure and temperature to break the large molecules into smaller components (smaller hydrocarbon molecules and even free hydrogen). Similar research work suggests that mixing a certain small amount of free hydrogen with the air-fuel mixture of a conventional engine also results in combustion which is practically free of pollutant emission.

On this background, it can now be appreciated that the stream of vaporized fuel which enters the cylinder under high pressure at the conclusion of the compression stroke also passes through the electric arc which is initiated in the spark gap at that time. Consequently, the conditions of high pressure and temperature necessary and sufficient for cracking hydrocarbon molecules can be achieved. The timing of the arc (spark) is such that it commences simultaneously with the injection of that charge of vaporized fuel and it lasts until all the charge has been injected. In addition to the function of igniting the fuel entering the combustion chamber, the arc (and high pressure) therefore also performs the function of cracking some of the hydrocarbon molecules immediately prior to their combination with the oxygen (combustion) of the fuel-air mixture. A certain amount of small molecules and hydrogen will therefore enter the lean charge and, the mentioned above, will contribute to a more complete combustion to result in a very low level of pollutants being produced. In other words, the cracking of some hydrocarbon molecules of the last injected charge results in a further improvement of the quality of the combination; this improvement is additional to the other beneficial characteristics described above.

Recapitulating to some extent, the cylinders of the engine unit E1 (FIG. 1) receive elementary charges of fuel which are in a vaporized form and which are provided either singly or in plurality for select combustion cycles in accordance with the current demand for torque at the shaft S. Ignition of fuel is by spark which ignites a vaporized fuel stream at the time of injection. The vaporization of the fuel stream requires localized heat, and the selective injection of elementary fuel charges requires a responsive control system. As indicated above, the engine unit E employs electrical energy in the injector-ignition units 28 (FIG. 2), which is relatively simple to control with precision and ease, in order to achieve proper vaporization of the fuel. Of course, various other heat-transfer arrangements may be employed in engines constructed in accordance with the present invention; however, the system described in detail below is considered to be illustrative. As can be seen, the spiral fuel duct 46 (FIG. 3) of each injector is located within the combustion chamber of the respective cylinder and consequently it absorbs heat during each combustion. Some of that heat is lost to the air admitted past the intake valve and the injector during the intake stroke; however, most of the heat remains in the fuel duct-vaporizer 46 to be used for vaporization of fuel which requires a substantial amount of energy (heat). For instance, in a 440 cu. in. engine, vaporization of each elementary charge of fuel requires about 6 gram-calories. To recapitulate, part of the heat necessary for fuel vaporizaton stored in the mass of duct 46. The rest of the heat is produced by the electric current circulating in that duct. It can now be appreciated that, as the engine warms up and operates with a substantial power output, more and more heat from previous combustions is used and less and less current-produced heat is needed. A sensor system, which is explained in detail below, senses such need and regulates the current to supply only the additional heat necessary for maintaining the vaporization temperature. Of course, engines according to this invention can use a more complicated fuel vaporizer, at a remote location (such as in the exhaust system) and with an independent control of the vaporizing process.

Figure 5:
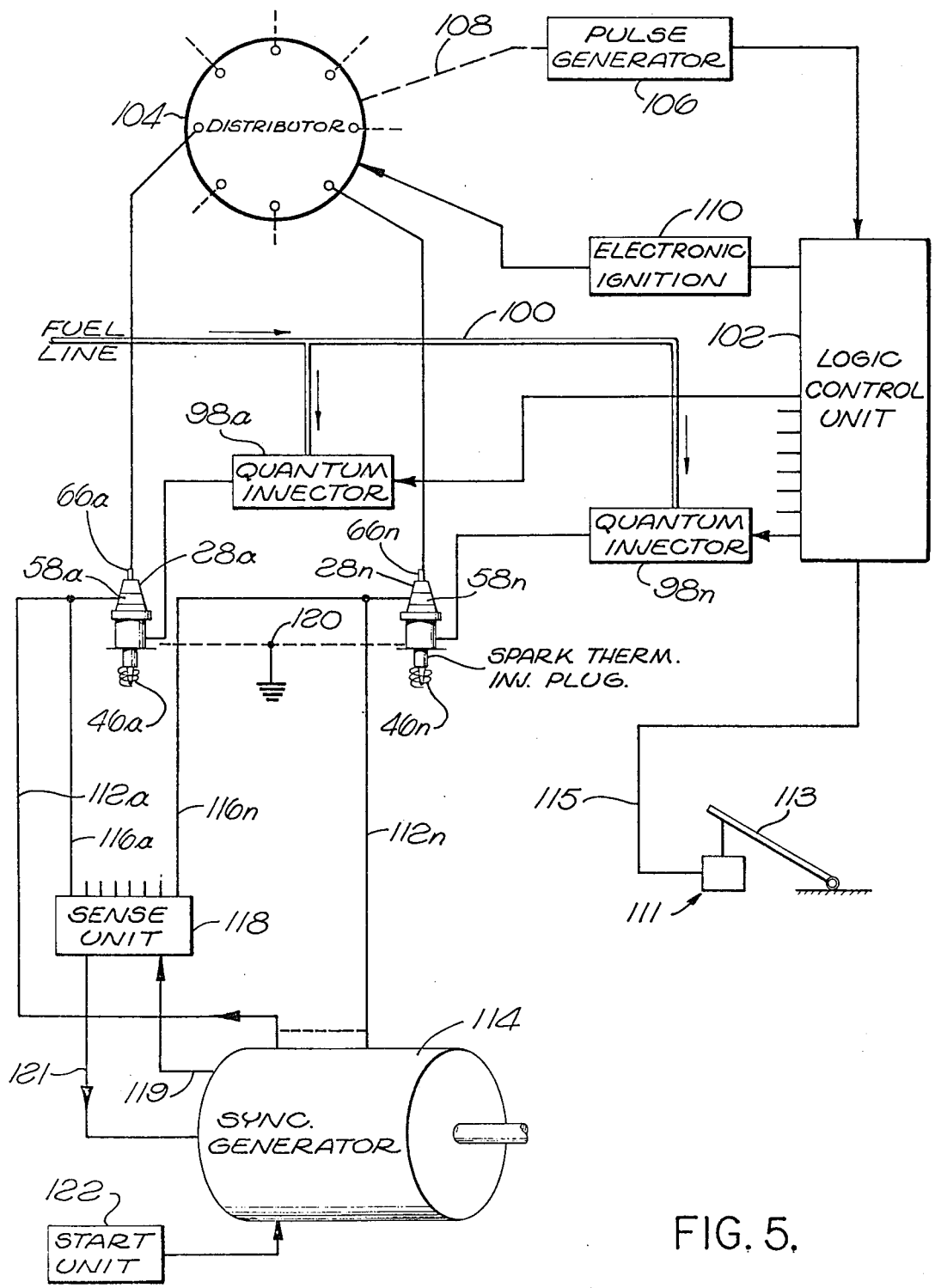
FIG. 5 is a schematic and block diagram of the system of FIG. 1.

Reference will now be made to FIGS. 5 for an explanation of the control system which provides ignition pulses, times the injection of vaporized elementary fuel charges and regulates the heating current to accomplish fuel vaporization.

As indicated above, the disclosed engine has eight cylinders, however, of course, the present invention may be embodied in engines of varying numbers of cylinders. Accordingly, a plurality of injector-ignition units 28 are represented in FIG. 5 individually designated by the numerals 28a through 28h. These units are in the structural form as disclosed in detail with reference to FIG. 3.

At locations adjacent the units 28a through 28a, associated quantum fuel meters 98a through 98n are represented, employing a similar system of designation. The meters 98a through 98n are connected to a major fuel line 100, from which charges of fuel are metered to the injector-ignition units 28a through 28n, respectively. The fuel meters 98a through 98n are also individually connected to a logic control unit 102 which functions to supply actuating electrical pulses.

The terminal ends 66a through 66n of the injector-ignition units 28a through 28n, respectively, are connected to a distributor 104 which provides high-voltage electrical impulses for the developement of ignition sparks. The distributor 104 is mechanically coupled to a pulse generator 106, as indicated by a dashed line 108, which generator 106 is in turn connected to the logic control unit 102 to provide synchronizing pulses that may be considered as a variablerate clock. That is, the synchronizing pulses from the generator 106 have a frequency that is directly related to the speed of the engine.

The control unit 102 is also connected to the distributor 104 through an electronic ignition unit 110 which is the source of the high-voltage spark pulses. A manual control apparatus 111 incorporating an accelerator 113 is illustrated separately from the logic control unit 102; however, a control coupling is represented by a line 115.

Returning to the injector-ignition units 28a through 28a, the low-voltage contact rings 58a through 58n are electrically connected by lines 12a through 112n to receive low-voltage power from a generator 114. The power supplied through the contact rings 58a through 58n in converted to heat for vaporizing fuel charges as explained above. The rings 58a through 58n are also connected through sense lines 116a through 116n to a master sense unit 118 which regulates the current flow through the lines 112a thrugh 112n. Specifically, the sensors in the unit 118 indicated the electrical resistance (revealed by the current flows through the lines 112a through 112n) of the fuel passages in the injector-ignition units 28a through 28n. That electrical resistance is a direct function of the temperature of said fuel passages which, besides the heat generated by the current circulating therethrough, also receive heat resulting from previous combustions in the respective cylinder. That is, the master sense unit 118 (in combination with synchronizing signals received through a line 119) formulates signals indicative of the temperature of the low-voltage electrodes in each of the units 28a through 28n. Such subsystems are well known and function by sensing current flows as indicative of resistance which is in turn indicative of temperature. In that manner, the unit 118 generates control signals for application through a line 121 to regulate the generator 114 and thereby controls heating currents in the lines 112a through 112n. The generator 114 may be a multiphase alternator driven by and thus synchronized with the engine; the control of the output electrical power may be readily achieved by controlling the current in the excitation windings of generator 114.

As indicated above, the fuel-heating electrical energy (through lines 112a through 112n) serves to vaporize fuel charges passing through the helical extensions 46a through 46a of the injector-ignition units 28. These currents are terminated in the engine block which is symbolically represented by the ground line 120. The spark-producing, high-voltage current received at the upper ends 66a through 66n of the high-voltage electrodes are across the spark gaps to be received at the low-voltage electrodes of each of the units 28a through 28n. The low-voltage generator 114 should have a substantial capability; of course, the generator 114 is driven by the engine (when in operation). The low-voltage electrodes of the units 28a through 28n are powered by a starting unit 122 (incorporating a battery) which temporarily replaces the generaor at the time of starting the engine.

Considering the operational sequence of the system as depicted in FIG. 5, the common shaft of distributor 104 and of pulse generator 106 is coupled to the engine, e.g., geared at a 1:2 ratio to shaft S (FIG. 1) to provide pulses that are synchronized with the engine. These pulses are supplied to the logic control unit 102 (described in detail below). The distributor 104 distributes ignition pulses from the ignition unit 110 to the individual spark-injector units 28a through 28n. Essentially, the timing operation, as disclosed in greater detail below, involves providing spark currents to each of the units 28a through 28n at the time (piston displacement related) indicated by the point 74 (FIG. 4) to initiate combustion. When no fuel is injected, as described above, the sparks merely serve to keep clean the spark gap.

The logic control unit 102 also controls the fuel meters 98a through 98n, considered in greater detail below, to provide discrete and uniform elemental charges of fuel to the units 28a through 28n. Such fuel charges are vaporized in the coil extensions 46a through 46n which are maintained at a controlled temperature by energy from the generator 114. That is, the master sense unit 118 controls the flow of electrical current through the individual conductors 112a through 112n to maintain the temperature of the heating coil extensions 46a through 46n within a critical range to accomplish the desired fuel vaporization.

From the above description, it is apparent that the system of FIG. 5 supplies vaporized fuel and ignition pulses to the individual cylinders 14 (FIG. 2) to drive the engine unit E (FIG. 1) in operating cycles as illustrated in FIG. 4. The components of the system of FIG. 5 which are treated in further detail are the logic control unit 102 and the fuel meters 98.

As indicated above, the fuel meters 98a through 98n are generally similar in structure and function and provide discrete quantities of fuel in response to digital pulses. Of course, these elements may vary widely; however, one form is illustrated in FIGS. 6, 7, 8 and 9 and will now be considered in detail. A magnetic core 130 (FIG. 6) is formed of laminated transformer steel and defines a substantial gap containing a plug 132 of nonmagnetic material. A coil 134 is provided about a solid portion of the core 130, having leads 136 for receiving electrical pulses to magnetize the core 130 and provide substantial flux extending out of the core 130 about the plug 132, as well known in the field of electromagnetics.

An armature 138, also comprising laminated transformer steel, is resiliently fixed by a mounting block 139 to be held in a location somewhat separated from the core 130. The space between the armature 138 and the core 130 is occupied by a resilient single chamber bellows element 140 which also acts like a spring to hold armature 138 attached to it. An elongate tapered space 150 is provided in the bellows element 140 which is integrally fixed in a fuel line 142. The bellows element 140 may comprise a pair of surface-abutting, elongated members 146 and 148 (FIG. 8) secured together along their abutting surfaces to define the elongated space 150.

The element 140 is operated in cooperation with a pair of check valves located at either end and structurally in the form of balls 152 and 154. Pumping action occurs when the core 130 is magnetized to provide substantial flux embracing the armature 138 and applying a considerable force between the armature and the opposed surface of the core 130. In view of the tapered form of the member 146, the end 160 (FIG. 9) tends to offer less support and, consequently, collapses prior to the end 162. The situation immediately prior to collapse is indicated in FIG. 9a. After an initial collapse, as represented in FIG. 9b, the end 160 is closed. Thereafter, as a result of the continued force, the element 140 collapses totally, as illustrated in FIG. 9c, with the result that a quantum of fuel is metered out of the space 150.

It is noteworthy that the quantity of fuel in each elementary charge may be relatively small, as for example, in an engine with a displacement of 440 cubic inches, the fuel charge might be $4 \times 10^{-3}$ cubic inches. Generally, the pressure on the bellows element 140 should be in the range of at least thirty atmospheres during the pulse. In view of these considerations, the structure involves relatively low power, e.g. peak 60 watts, operative on a one millisecond pulse and involving an armature excursion of 0.5 millimeters (.020 inch). Of course, as indicated above, a wide variety of different design details may be employed.

Pulses to actuate the fuel meters 98 are provided from the logic control unit 102 (FIG. 5). The logic control unit, as indicated above, broadly controls the amount of fuel consumed in response to the demands of power from the engine. More specifically, the unit 102 controls the injection of elementary charges into individual cylinders to in turn control power or torque. The structure of the logic control system 102 will now be considered in detail.

Figure 11:
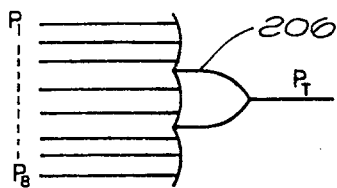
FIG. 11 is a schematic diagram of another fragment of the system of FIG. 5.
Figure 10:
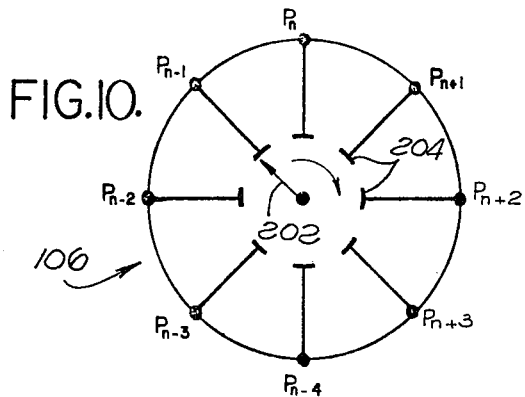
FIG. 10 is a symbolic representation of a fragment of the system of FIG. 5.
Figure 13:
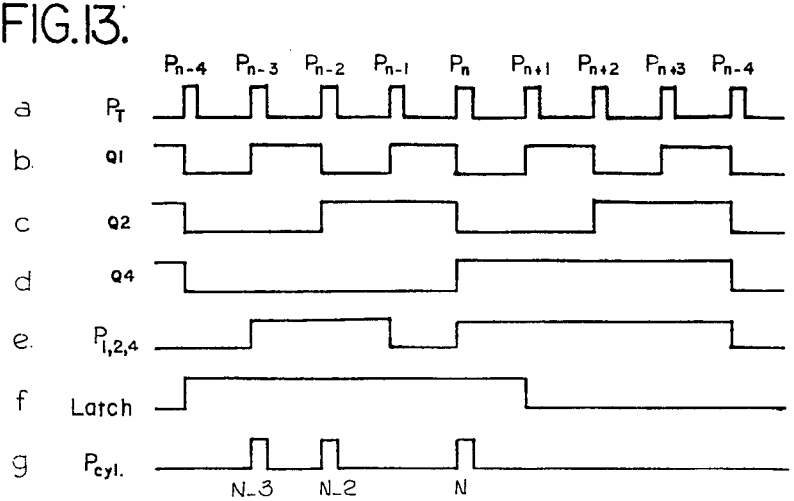
FIG. 13 is a graphic representation of wave forms illustrative of the signals in the system of FIG. 12.

Initially, consideration will be directed to the component of the system 102 for providing pulses to command the injection of elementary fuel charges. In that regard, FIG. 10 illustrates in schematic form the pulse generator 106. The generator is indicated to include a rotor 202 (symbolically represented, electronically embodied) which engages eight segments 204 in sequence to provide pulses for ignition in each of the eight cylinders of the engine unit E. The pulses have been designated in general symbols: $P_{n-4}$, $P_{n-3}$, $P_{n-2}$, $P_{n-1}$, $P_n P_{n+1}$, $P_{N+2}$, and $P_{n+3}$. These symbols refer to the cycle of that cylinder which ignites at the time of the pulse designated $P_n$. The series of pulses is illustrated in the waveform of FIG. 13a, and in that regard, it is noteworthy that the pulses are applied to an "or" gate 206 (FIG. 11) to develop a pulse train $P_T$. One function of the pulse train $P_T$ is to synchronize the electronic ignition unit 110. As indicated above, the pulse train $P_T$ may be analogized to avariable-frequency clock that is synchronized with the engine.

During the minimal power mode, the individual cylinder receives a single elementary fuel charge toward or at the end of the compression stroke. The presence of signals $C_I$ or $P_I$ designates such a mode of operation and command such a fuel injection. During the high-power mode of operation, commanded by a signal $P_H$, plural elementary fuel charges are injected at times explained above. Each of the several control circuits for providing pulses to command these fuel injections for each cylinder is similar. Consequently, a single representative apparatus will be considered in detail as depicted in FIG. 12.

Relating the structure to the general case (FIG. 10), the compression stroke is terminated substantially at the time of the pulse $P_n$. It should be appreciated that the eight pulses developed by the pulse generator 106 are definitive of an operating cycle for each piston in the engine as well as the total engine. Specifically, the three intervals for injection of elementary charges of fuel in the general case coincide to the times of pulses: $P_{n-3}$, $P_{n-2}$, and $P_n$, as indicated in FIG. 13g. Consequently, the function of the structure illustrated in FIG. 12 is to provide such pulses in the event that the signal $P_H$ is high at the time defined by $P_{n-4}$ to command the high-power operating mode.

Figure 12:
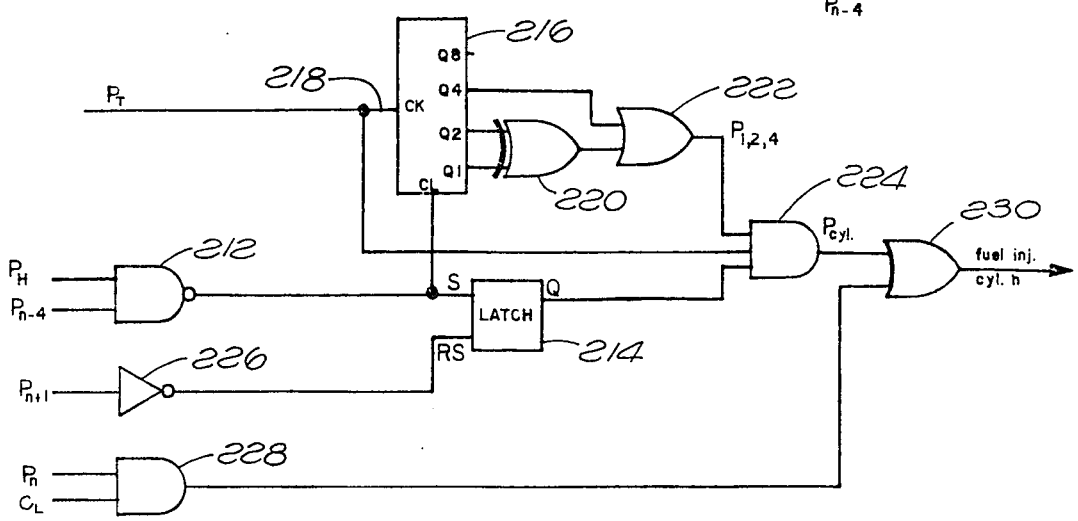
FIG. 12 is a logic diagram of another fragment of the system of FIG. 5.

As indicated in FIG. 12, the signal $P_H$ is applied to a "nand" gate 212 along with the signal $P_{n-4}$ which serves as a timing signal. Of course, the timing circuit for each cylinder would receive the specific pulse designating the cycle of that cylinder which can be defined by termination of the compression stroke, generally designated $P_n$. Upon qualification of the nand gate 212, a latch 214 is set as indicated by the waveform of FIG. 13f. Concurrently, a four-stage binary counter 216 is cleared. In that manner, an operating cycle is initiated to generate the three pulses (FIG. 13g) for timing the injection of a series of elementary fuel charges to achieve a full-power stroke.

The counter 216 is connected to receive pulses $P_T$ at an input 218. In a conventional manner, each pulse $P_T$ advances the binary count in the counter 216, e.g. $Q_1$, $Q_2$, $Q_4$ and $Q_8$. That is, the stages Q of the counter 216 are designated $Q_1$, $Q_2$, $Q_4$ and $Q_8$ with their binary significance. Each pulse $P_t$ alters the state of the stage $Q_1$ as indicated by the waveform of FIG. 13b. Alternate pulses alter the state of the stage $Q_2$ (waveform of FIG. 13c). The stage $Q_4$ is altered on every fourth pulse (waveform of FIG. 13d), and stage $Q_8$ is unused.

The set sides of the stages $Q_1$ and $Q_2$ are connected to the inputs of an exclusive or gate 220, the output from which, along with the set side of the stage $Q_4$, is connected to an or gate 222. Essentially, the combination of the exclusive or gate 220 and the or gate 222 may be summarized as attaining a high output whenever the signals $Q_1$ and $Q_2$ are in opposed states or whenever $Q_4$ is in a set or high state. Consequently, a signal $P_{1,2,4}$ ($P_1$, $P_2$, $P_4$) is generated, as represented in the waveform of FIG. 13e, and is applied to an and gate 224. The pulse train, signal $P_T$ is also applied to the and gate 224 along with the set or high signal from the latch 214. Therefore, the and gate 224 is qualified during the intervals of each pulse $P_T$ which coincides to the latch 214 being set and the developed signal $P_1$, $P_2$, $P_4$ being in a high state. As a consequence, the output from the and gate 224 (termed $P_{cyl}$) is the developed timing signal for the cylinder, as represented in the waveform of FIG. 13g.

Of course, operation of the circuit must be cyclic and in that regard, the latch 214 is reset by an inverter 226 upon the occurrence of the pulse $P_{n+1}$. Thus, cyclic operation of the circuit provides the desired high-power series of control pulses on command.

The solitary low-power fuel-control pulses, as indicated above, coincide in time with the pulse $P_n$. These pulses are generated on command by an and gate 228. Inputs to the and gate 228 are: the pulse $P_n$ and the signals $C_I$ or $P_b$, the latter two signals commanding low-power operation. Upon qualification, the and gate 228 passes a signal coinciding in time to the pulse $P_n$ which signal is applied to an or gate 230 along with the signal $P_{cyl}$. Thus, the or gate 230 provides a series of output pulses for controlling fuel injections to a specific cylinder of the engine. As indicated above, the logic control unit 102 (FIG. 5) includes a multiplicity of structures as illustrated in FIG. 12, i.e., one such structure for each cylinder, which control the meters 98 (FIG. 5) through a power booster stage which may be a Darlington power transistor pair as is well known in the prior art; consequently, the power booster stages, one for each cylinder (or meter 98), have not been shown.

The above description assumed the signals $P_H$, $C_I$ and $P_I$ which command the modes of high-power operation and low-power operation. Of course, the absence of such signals simply results in no fuel being injected and burned during a combustion cycle to attain the no-power mode, as described above. Consideration will now be given to the apparatus for developing the control signals $P_H$, $P_I$ and $C_I$ in accordance with the immediate power demand imposed on the engine.

In general, the signal $P_H$ commands a full-power cycle in a cylinder to respond to a manual control, e.g., accelerator 113 (FIG. 5). The signal $C_I$ is developed upon the control system sensing a state of the engine at which an increased power output is required to avoid shaking or noticeably irregular operation. Thus, several aspects of control exist. Recapitulating, each combustion cycle of a piston may selectively involve: no combustion, a combustion of a single elementary fuel charge or a combustion of a multiple-charge quantity of fuel. Such control relates fuel consumption to power demand. Furthermore, the combustion cycles are somewhat similar to the Diesel cycle, and the stratified charge, respectively, resulting in considerable improvement with regard to pollutants.

The control for establishing a cylinder combustion pattern for the engine involves some secondary considerations. Specifically, it is important to distribute no-fire cycles (when no fuel is burned) in order to maintain somewhat more balanced operation of the engine. Also, it is significant that each specific cylinder periodically have some fuel burned therein to maintain a satisfactory operating temperature in the cylinder. It results from these considerations that the "skipped" and "active" cycles (cycles without and with combustion, respectively) should succeed in a predetermined pattern, the structure of which is dictated by the average output torque demanded from the engine at the time. It is well known that the force exerted on each piston as a result of combustion in the respective cylinder is converted to torque at the crankshaft; thus the average output torque is a function of the number and of the magnitude of the elements of torque furnished by each cylinder. For example, the output torque of an eight-cylinder engine in which only four cylinders are fired to have active cycles is about half of the torque given by the same engine with all cylinders fired, all other conditions being equal. This philosophy of operation can be generalized to show that the moment of inertia of rotary parts (flywheel, crankshaft, etc.) averages whatever active elements of torque are provided by the power strokes of various cylinder-piston systems. It is also evident that an even spacing in time of active and non-active cycles will result in a smooth output of torque. Consequently, the patterns of firing which control the torque and thus the power output of the engine presently disclosed are predetermined by the logic control unit 102 such as to be closest to the desired characteristics explained above.

The structure of firing patterns is explained below, assuming first that all active cycles result in an equal force at the piston, i.e., that whenever combustion occurs in a cylinder the same number of elementary charges have been injected in that cylinder. The maximal torque output results from making active every possible cycle generated by the pumping flow of the engine, e.g., in an eight-cylinder engine a maximum of four power strokes can be obtained for each turn of the crankshaft. At the end of two revolutions each one of the eight cylinders has provided a power stroke. When some of these power strokes are missing, as a result of skipping the active cycle of some cylinders, the average torque will decrease in the proportion defined by the number of active cycles divided by the total number of active plus blank or skipped cycles. Therefore we can write:

$$T_{AVG} = T_{MAX} \frac{\text{Nr. of active cycles}}{\text{Total Nr. of cycles}} \quad (a)$$

or $$\frac{T_{AVG}}{T_{MAX}} = \text{Nr. or active/total cycles} \quad (a')$$

where $T_{AVG}$ is the actual average torque and $T_{MAX}$ is the maximal torque output which can be obtained with combustion of the same charge and with firing every possible cycle. For instance, if one cycle out of every three is skipped, i.e., two out of three cycles are active, the average torque decreases in the proportion $\frac{2}{3}$ from the maximal torque.

Control unit 102 is based on arithmetic programs which can generate a succession of fire — no-fire pulses to result in a number of fractions such as described by equation (a), to cover the whole range of desired output torque. To that effect, the number of skipped cycles is designated by $N+1$ and the number of active cycles is designated by $2M+N$, where M and N are arbitrary integer positive numbers. The total number of successive cycles of the various cylinders of the engine in one sequence is therefore $(N+1)+(2M+N)$ or the sum of skipped and active cycles. The factor by which the maximal torque is reduced, according to relation (a) above, is $$\frac{T_{AVG}}{T_{MAX}} = \frac{\text{active cycles}}{\text{total cycles}} = \frac{2M+N}{(N+1)+(2M+N)} = \frac{2M+N}{2M+2N+1} \quad (B)$$

Table A (below) shows the values of fraction (b) for various values of M and N; those values are also expressed as percentage (given below each fraction of the table).

TABLE A $$\left(= \frac{2M+N}{2M+2N+1}\right)$$

| N= | 0 | 1 | 2 | 3 | 4 | 5 | 6 | 7 |
|---|---|---|---|---|---|---|---|---|
| M= | | | | | | | | |
| 1 | 2/3 =66.7% | 3/5 =60.0% | 4/7 =57.1% | 5/9 =55.6% | 6/11 =54.5% | 7/13 =53.8% | 8/15 =53.3% | 9/17 =52.9% |
| 2 | 4/5 =80.0% | 5/7 =71.4% | 6/9 =66.7% | 7/11 =63.6% | 8/13 =61.5% | 9/15 =60.0% | 10/17 =58.8% | 11/19 =57.9% |
| 3 | 6/7 =85.7% | 7/9 =77.8% | 8/11 =72.7% | 9/13 =69.2% | 10/15 =66.7% | 11/17 =64.7% | 12/19 =63.2% | 13/21 =61.9% |
| 4 | 8/9 =88.9% | 9/11 =81.8% | 10/13 =76.9% | 11/15 =73.3% | 12/17 =70.6% | 13/19 =68.4% | 14/21 =66.7% | 15/23 =65.2% |
| 5 | 10/11 =90.9% | 11/13 =84.6% | 12/15 =80.0% | 13/17 =76.5% | 14/19 =73.7% | 15/21 =71.4% | 16/23 =69.6% | 17/25 =68.0% |
| 6 | 12/13 =92.3% | 13/15 =86.7% | 14/17 =82.4% | 15/19 =78.9% | 16/21 =76.2% | 17/23 =73.9% | 18/25 =72.0% | 19/27 =70.4% |
| 7 | 14/15 =93.3% | 15/17 =88.2% | 16/19 =84.2% | 17/21 =81.0% | 18/23 =78.3% | 19/25 =76.0% | 20/27 =74.1% | 21/29 =72.4% |

The number of skipped cycles $(N+1)$ divided by the total number of cycles $(2M+2N+1)$ of the sequence is also a useful indication of output and has therefore the value $$\frac{N+1}{2M+2N+1} = \frac{T_{MAX} - T_{AVG}}{T_{MAX}} \qquad (c)$$

Table B (below) shows the values assumed by the fraction cc) for various M and N numbers.

TABLE B $$\left( = \frac{N+1}{2M+2N+1} \right)$$

| N=<br>M= | 0 | 1 | 2 | 3 | 4 | 5 | 6 | 7 |
|---|---|---|---|---|---|---|---|---|
| 1 | 1/3<br>=33.3% | 2/5<br>=40.0% | 3/7<br>=42.9% | 4/9<br>=44.4% | 5/11<br>=45.6% | 6/13<br>=46.2% | 7/15<br>=46.7% | 8/17<br>=47.1% |
| 2 | 1/5<br>=20.0% | 2/7<br>=28.6% | 3/9<br>=33.3% | 4/11<br>=36.4% | 5/13<br>=38.6% | 6/15<br>=40.0% | 7/17<br>=41.2% | 8/19<br>=42.1% |
| 3 | 1/7<br>=14.3% | 2/9<br>=22.2% | 3/11<br>=27.3% | 4/13<br>=30.8% | 5/15<br>=33.3% | 6/17<br>=35.9% | 7/19<br>=36.8% | 8/21<br>=38.1% |
| 4 | 1/9<br>=11.1% | 2/11<br>=18.2% | 3/13<br>=23.1% | 4/15<br>=26.7% | 5/17<br>=29.4% | 6/19<br>=31.6% | 7/21<br>=33.3% | 8/23<br>=34.8% |
| 5 | 1/11<br>=9.1% | 2/13<br>=15.4% | 3/15<br>=20.0% | 4/17<br>=23.5% | 5/19<br>=26.3% | 6/21<br>=28.6% | 7/23<br>=30.4% | 8/25<br>=32.0% |
| 6 | 1/13<br>=7.7% | 2/15<br>=13.3% | 3/17<br>=17.6% | 4/19<br>=21.1% | 5/21<br>=23.8% | 6/23<br>=26.1% | 7/25<br>=28.0% | 8/27<br>=29.6% |
| 7 | 1/15<br>=6.7% | 2/17<br>=11.8% | 3/19<br>=15.8% | 4/21<br>=19.0% | 5/23<br>=21.7% | 6/25<br>=24.0% | 7/27<br>=25.9% | 8/29<br>=27.6% |

It is thus clear that a multitude of levels of output torque can be achieved by taking appropriate M and N numbers. These levels, however, cover only the range from full torque ($T_{AVG} \leq 100\% \, T_{MAX}$) to about half that value ($T_{AVG} > 50\% \, T_{MAX}$). The other half of the range is covered by inverting the logic signals (fire, no-fire) such as N+1 to become the number of actual, instead of blank (skipped) cycles. This procedure will be explained in detail below. It is sufficient at this point, though, to note that following the mentioned inversion the ratio of active to total cycles becomes $$\frac{N+1}{2M+2N+1} = \frac{T_{AVG}}{T_{MAX}} \qquad (d)$$

Under these conditions, Table B represents the output torque and, conversely, Table A represents the percentage of skipped cycles. Recapitulating to some extent, any of the levels of output torque shown by Tables A and B can be obtained by a correct choice of M, N, and of whether driving logic pulses are inverted or not. A closer look at Tables A and B also shows that not all values are necessary in order to obtain a smooth control of the output torque. Constant steps of 6.66% increase (or decrease) are obtained by taking only the values on one main diagonal of the tables, which are indicated by underligning.

A sequence of pulses, synchronized with the pulses $P_T$ described above and therefore with the engine, decides whether the cycle of a certain cylinder is active or not according to whether a logic "1" or "0" appears at the appropriate time. (As is has been explained above, the full-power cycle of the cylinder which ignites at $P_n$ should start with fuel injections at $P_{n+3}$. Consequently, the logic pulse which decides about the respective cylinder having an active cycle should assume the value 1 at the time of $P_{n+4}$.) The number of pulses (1) triggering active cycles versus the total number of pulses (1's and 0's) of the sequence can be made to fit the values shown in Tables A and b, to control the average output torque. Several methods of generating the various sequences of pulses can be utilized. Given below is the method which, at the present time, is thought to be most advantageous.

Figure 14:
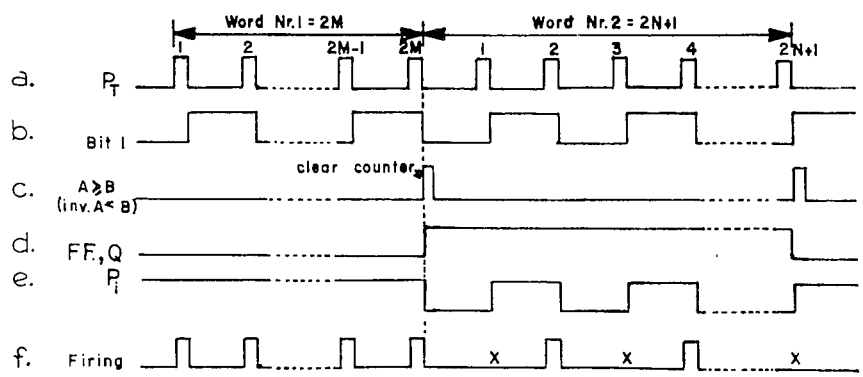
FIG. 14 is a graphic representation of wave forms developed in the system of FIG. 15.

The upper half of the output range (100% > $T_{AVG}/T_{MAX}$ > 50%) is covered by generating first a sequence of 2M one pulses, i.e., triggering 2M active cycles. Sequence No. 1 is followed by sequence No. 2 which consists of 2H+1 possible pulses; starting with a zero, zero and one pulses are alternating, i.e., every active cycle is followed by a blank cycle in the normal succession of cycles of the engine as defined by the pulse train $P_T$ explained above. FIG. 14a shows graphically the two sequences of pulses described here. At this point it becomes evident that out of 2N+1 pulses in the second sequence only N pulses are one and the rest are 0. The number of active cycles is 2M and N, triggered by the one pulses in sequence No. 1 and No. 2, respectively. Thus, a total of 2M+N active cycles result from a total of 2M+(2N+1) possible cycles covered by sequence No. 1 and No. 2, after which the whole series is repeated. It can be easily seen that the ratio of active to total cycles is 2M+N/2M+2N+1 or, exactly, the value of fraction (b) above. Once established that sequence No. 1 triggers all cycles and sequences No. 2 triggers alternate cycles, the only necessary information in order to generate the pattern described is the total number of pulses in each sequence, or, respectively, 2M and 2N+1. These two numbers can be stored and processed, according to conventional computing-circuit technology, in the form of two binary numbers or words. Therefore we will refer from now on to word 1 and word 2 which, in this case, are 2M and 2N+1, respectively.

It can be seen that the pattern described not only can fit any of the fractions of Table A, but also (1) skips no more than one cycle in sequence, and (2) distributes evenly the active cycles to various cylinders. To clarify the latter statement, we will represent active cycles by 1 and blank cycles by 0 in a pattern made of eight-element lines to show the complete cycle of an eight-cylinder engine. Let us assume that M=1 and N=1, and so word No. 1 is 2M=2 (or 1,1) and word No. 2 is 2N+1=3 (or 0,1,0); the output factor is 2M+N/2M+2N+1= 3/5. The eight-cylinder pattern is

| 1 | 1 | 0 | 1 | 0 | 1 | 1 | 0 |
| 1 | 0 | 1 | 1 | 0 | 1 | 0 | 1 |
| 1 | 0 | 1 | 0 | 1 | 1 | 0 | 1 |
| 0 | 1 | 1 | 0 | 1 | 0 | 1 | 1 |

-continued

| 0 | 1 | 0 | 1 | 1 | 0 | 1 | 0 |
|---|---|---|---|---|---|---|---|
| $\overline{1}$ | $\overline{1}$ | $\overline{0}$ | $\overline{1}$ | $\overline{0}$ | $\overline{1}$ | $\overline{1}$ | $\overline{0}$ |

It appears evident that (1) there are not 2 "zeros" in sequence on any line, which results in an even torque, and (2) any one cylinder is not skipped for more than two engine cycles (2lines) or, in any column there are not more than 2 "zeros" in sequence; this results in an even distribution of heat to the various cylinders.

It can also be seen that the pattern repeats itself after five lines. The general case of this algorithm is that the pattern is repeated after a number of lines which is the denominator of the ratio described by (b) or by Table A.

In the lower half of the output torque range ($T_{AVG} <$ 50%) it would not be possible to skip only one firing in sequence; however, the minimal number of blanks in sequence can be achieved by simply inverting all logic signals in one pattern. The torque ratio thus becomes $$\frac{N+1}{2M+2N+1}$$

(c) which results from replacing all ones with zeros in the pattern in which the torque ratio was $$\frac{2M+N}{2M+2N+1}$$

Of course the numbers M and N remain the same. As an example, the "inverted" pattern 3/5 described above becomes 2/5 as shown by the eight-cylinder pattern below:

| 0 | 0 | 1 | 0 | 1 | 0 | 0 | 1 |
|---|---|---|---|---|---|---|---|
| 0 | 1 | 0 | 0 | 1 | 0 | 1 | 0 |
| 0 | 1 | 0 | 1 | 0 | 0 | 1 | 0 |
| 1 | 0 | 0 | 1 | 0 | 1 | 0 | 0 |
| 1 | 0 | 1 | 0 | 0 | 1 | 0 | 1 |
| $\overline{0}$ | $\overline{0}$ | $\overline{1}$ | $\overline{0}$ | $\overline{1}$ | $\overline{0}$ | $\overline{0}$ | $\overline{1}$ |

Similar to the other example, the spacing on lines and columns is relatively even, to result in smooth output and uniform distribution of heat.

It is to be noted that by selecting values from the two tables as designated by being underlined, a smooth set of transitory patterns can be accomplished. Specifically, the selected values of M and N, along with the developed words No. 1 and No. 2, the percentage of skipped cycles and the torque is set out in Table C. The first column of the table indicates the decimal number which, when converted into a binary word, defines the address of a memory element where the desired words No. 1 and No. 2 are stored. This address number ranges from 1 to 31, which requires a five-bit binary word. Table C shows that the inverting of all output pulses, as necessary to cover the lower half of the torque range ($T_{AVG} < $ 50% $T_{MAX}$), occurs for any address number smaller than 8. In other words, when the fourth bit of the binary address number is off (low), the output pulses are inverted and, conversely, any number equal with 8 or larger will hold that fourth bit on (high) to prevent inverting. Table C is given below:

TABLE C

| | | | | ($C_L = 0$), Full or Zero Torque Cycles | | | | |
|---|---|---|---|---|---|---|---|---|
| Program Address (ROM Input) | Nr. of Skipped Cycles/ Nr. of Possible Cycles | Program (ROM) Structure | | | | | | Avg. Torque (% of Mag. Possible Torque) |
| | | M | N | Word No. 1 (2M) | Word No. 2 (2N + 1) | Aη | % Skipped Cycles | |
| 1 | 14/15 | 7 | 0-inv. | 14 | 1 | 0 | 93.3% | 6.7% |
| 2 | 13/15 | 6 | 1-inv. | 12 | 3 | 0 | 86.7% | 13.3% |
| 3 | 12/15 | 5 | 2-inv. | 10 | 5 | 0 | 80.0% | 20.0% |
| 4 | 11/15 | 4 | 3-inv. | 8 | 7 | 0 | 73.3% | 26.7% |
| 5 | 10/15 | 3 | 4-inv. | 6 | 9 | 0 | 66.7% | 33.3% |
| 6 | 9/15 | 2 | 5-inv. | 4 | 11 | 0 | 60.0% | 40.0% |
| 7 | 8/15 | 1 | 6-inv. | 2 | 13 | 0 | 53.3% | 46.7% |
| 8 | 7/15 | 1 | 6 | 2 | 13 | 1 | 46.7% | 53.3% |
| 9 | 6/15 | 2 | 5 | 4 | 11 | 1 | 40.0% | 60.0% |
| 10 | 5/15 | 3 | 4 | 6 | 9 | 1 | 33.3% | 66.7% |
| 11 | 4/15 | 4 | 3 | 8 | 7 | 1 | 26.7% | 73.3% |
| 12 | 3/15 | 5 | 2 | 10 | 5 | 1 | 29.0% | 80.0% |
| 13 | 2/15 | 6 | 1 | 12 | 3 | 1 | 13.3% | 86.7% |
| 14 | 1/15 | 7 | 0 | 14 | 1 | 1 | 6.7% | 93.3% |
| 15-31 | 0/14 | 7 | 2N + 1 = 0 | 14 | 0 | 1 | 0.0% | 100.0% |

The words (word No. 1 and word No. 2) are stored in a read-only memory to become available in response to the addresses as indicated in the above Table C. For example, a program address 8 produces word No. 1 as No. 2 and word No. 2 as 13. As a consequence, a number of skipped cycles will be 7, with the result that some 46.7% (=7/15) of the fifteen cycles are skipped providing a torque (percentage of maximum) as 53.3%.

Figure 15:
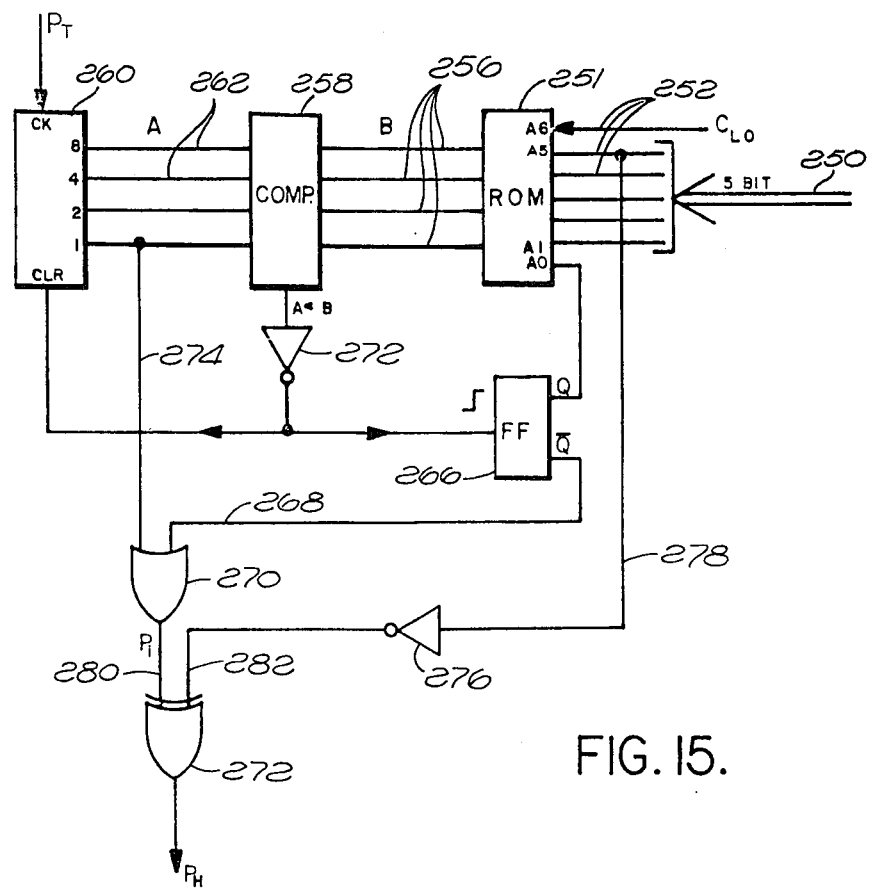
FIG. 15 is a block diagram of still another fragment of the system of FIG. 5.

The individual words No. 1 and No. 2 are formulated as five-bit binary numbers which are stored in memory responsive to addresses that are provided from a binary coder mechanically incorporated in the accelerator 113 (FIG. 5). That is, depending upon the extent to which the accelerator 113 is depressed, varying binary-code addresses (Chart C above) are provided to command code words No. 1 and No. 2 (jointly) from which the desired operating pattern is developed to attain the specified output torque from the engine. The five-bit word code is represented by binary signals provided from the accelerator encoder 111 (FIG. 5) carried in a five-conductor cable 250 (FIG. 15). The cable 250 includes five conductors 252 that are connected to address a read-only memory 251, the output of which is carried in four conductors 256 as sets of binary signals (4-bit word) alternately representative of the words No. 1 and No. 2. The conductors 256 are coupled to a comparator 258 which also receives four binary signal inputs from a counter 260 through a set of four conductors 262.

Considering the operation of the apparatus as illustrated in FIG. 15, timing pulses $P_T$ are applied to the counter 260 to initiate repeated counts to the value first of the word No. 1 then second to the value of word No. 2. The words are provided from the read-only memory 251 in response to the five-bit address codes supplied through the conductors 252 and also under control of a flip flop 266. That is, the sequence is alternated, e.g. word No. 1 followed by word No. 2, followed by word No. 1, . . . depending on the state of the flip flop 266.

On receipt of an address at the memory 250, with the flip flop 266 clear (Q low, $\overline{Q}$ high), word No. 1 is supplied on the conductors 256 to the comparator 258. Concurrently, the timing pulses $P_T$ are tallied by the counter 260 initiating a count toward the value of the word No. 1. During that time, as the flip flop 266 is cleared (providing a high signal from output $\overline{Q}$ through a conductor 268 to an or gate 270), the output P is high (FIG. 14e).

The flip flop 266 remains in the same state until the count in the counter 260 attains the value of the word No. 1 as manifest on the conductors 256. At that time, the comparator 258 provides an output signal to an inverter 272. As a consequence, the flip flop 266 is set (Q high, $\overline{Q}$ low) so that the output $\overline{Q}$ to the or gate 270 becomes low. Concurrently, the set state of output Q of the flip flop 266 results in the application of a high signal to the first bit of the address input of memory 250, thereby specifying the presentation of word No. 2 from the memory 250 to the conductors 256. During the interval of the word No. 2, a count is again performed by the counter 260; however, in view of the connection by line 274 (from the least significant stage of the counter 260) to the or gate 270, the output from the gate 270 is high only during alternate pulse intervals. Consequently, the alternate signal development (FIG. 14e) is attained.

Word No. 2 is initiated and maintained until the count in the counter 260 again attains the value of the word No. 2 at which time another pulse is provided from the comparator 258 to reset the flip flop 266 thereby commanding word No. 1 from the memory 250 and a repetition of the sequence as above. Consequently, the output from the or gate 270 is as depicted in the wave train of FIG. 14e, with the pulses representing active combustion cycles. Thus, all cycles during the word No. 1 are active and during word No 2 alternate cycles are skipped. As indicated above in Chart C, such a format may be employed to accomplish any of a wide variety of power patterns to attain the desirable torque for the engine, from maximal to 53.3% of maximal torque. Accordingly, each time the output ($P_i$) from the or gate 270 is high during a pulse $P_T$, combustion will take place in the cylinder of coinciding time relationship. It is reminded at this point that the cylinder in which ignition occurs at $P_n$ will start the fuel injection cycle at $P_{n-4}$ and therefore the pulse $P_T$ which triggers such full-power cycle is $P_{n-4}$ or, in other words, the output of gate 270 should be high at time $P_{n-4}$. Such combustion will be a full-fuel or multiple-charge combustion. Therefore the range from full to half the maximal output torque is covered with combinations of pulses such as shown in FIG. 14f; these combinations are numerically shown in Table C, the range being from address number 8 to 15. Between addresses 8 and 14 the binary words No. 1 and No. 2 are generated as it has been explained above. To achieve full torque, however, no cycles should be skipped. To that effect address 15 contains a word No. 2 which departs from the expression 2N+1 and has the value zero (symbolically shown in Table C by the relation 2N+1=0 which is arithmetically incorrect but is useful for brevity). As a consequence of this particular case, when the counting of pulses in word No. 1 is completed and flip flop 266 changes states, the comparator 258 generates a signal through inverter 272 before any count is accumulated in counter 260. This signal resets therefore flip flop 266 to result in word No. 1 being again generated by ROM 251. In other words, only binary word No. 1 is generated during the counting cycles of counter 260 and thus all output pulses are one. The full torque is therefore achieved by all possible cycles being active.

The lower half of the torque range ($T_{AVG} < 50\%$ $T_{MAX}$) is covered by logic inversion of all output pulses, as it has been explained above and is shown in Table C for address numbers from 1 to 7. To carry this process into effect, line 278 connects input A5 (the fifth bit of the binary address number) of memory 251 to an inverter 276. The output of the inverter becomes one of the inputs of exclusive or gate 272. As is known, an exclusive or gate inverts all pulses received at one input, such as line 280, when the other input (282) is held high or one. Therefore, when the binary address number is less than eight, the input A5 to ROM 151 is low, which results in the output 282 from inverter 276 being high and consequently results in inverting of all pulses received at the other input 280 of gate 272. The inverted pulses now become the signal $P_H$. Under these conditions, all cycles of the engine are skipped during binary word No. 1 and only alternate cycles are skipped during word No. 2, starting with one active cycle. The low range of torque (and thus power) is therefore covered as shown by Table C.

Once the engine presently disclosed has been brought under the control of computer-logic circuitry, several other functions can be readily implemented. Since the computer-logic technology is well developed it would be beyond the scope of the present disclosure to describe in detail the circuits which prevent stalling of the engine, or which idle it correctly, or which prevent a too-irregular torque output.

Figure 16:
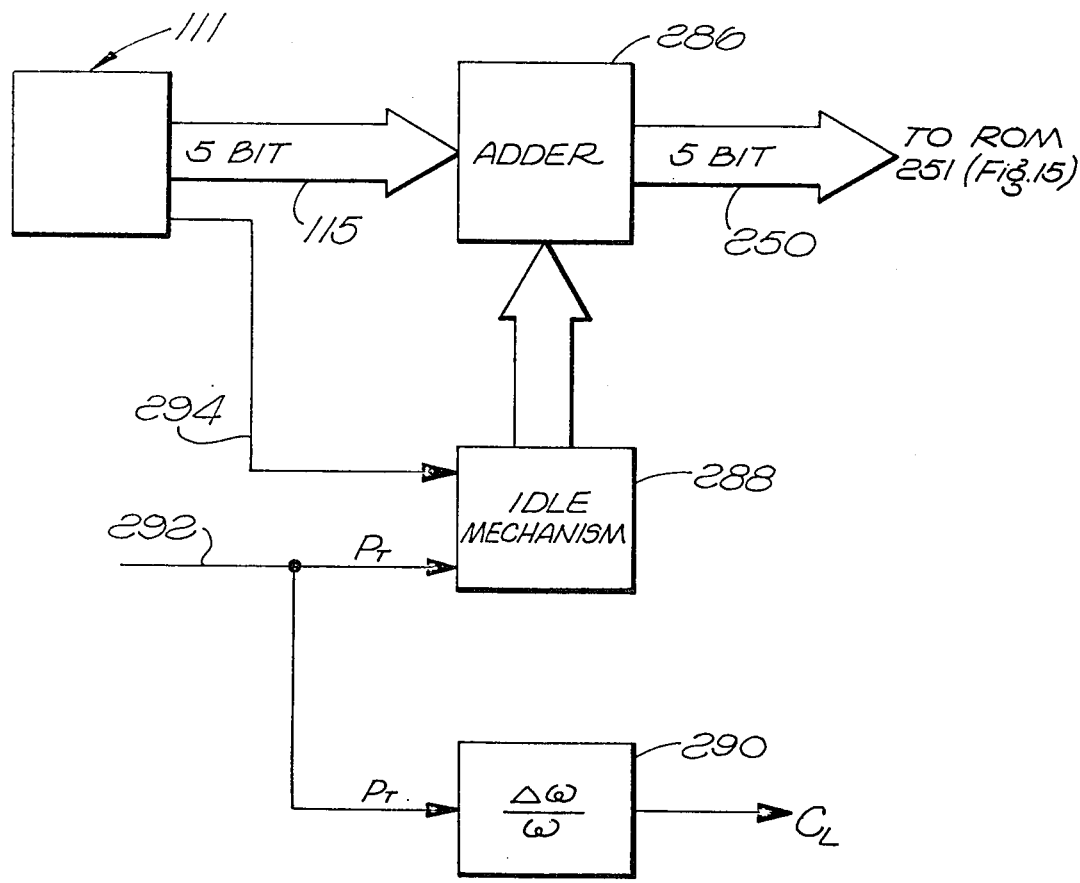
FIG. 16 is a block diagram of still another component of the system of FIG. 5.

FIG. 16 shows the block diagram of logic circuits which are exemplary of implementing the functions mentioned above. The five-line cable 115 coming from the manual encoding unit 111 (FIG. 5) inputs an arithmetic adder 286 instead of connecting directly into line 250 which inputs memory 251 (FIG. 15). Adder 286 also accepts a five-bit input from the idle mechanism 288 which, in turn, receives the pulses $P_T$ described above. Since the train of pulses $P_T$ is synchronized with the engine, the spacing in time of those pulses indicates the momentary speed of the engine. Mechanism 288 processes that information and stores a binary number in a storage element such as an up-down counter. Said number increases if the idle speed is too low, or decreases if it is too high. These changes occur only when line 294 from the manual encoder (gas pedal) 111 is energized to indicate the intention of idling the engine. The number furnished by idle mechanism 288 is therefore added in adder 286 with the number received from line 115 which results in increasing or decreasing the address number according to the necessary changes in the speed of the engne. The number stored and provided by mechanism 288 is useful not only for idling, but also for a smoother communication of the driver with the engine. It is evident that the lower end of the range of output torque, as indicated by the address number on line 250 to memory 251, starts with the number provided by mechanism 288. The latter then automatically takes care of various conditions of the engine such as temperature, viscosity of the oil, air pressure, etc. In other words, the output range always starts with the correct value without intervention of the driver. Another function is implemented by logic unit 290, labeled $\Delta\omega/\omega$. This unit receives pulses $P_T$ and senses the instant variations $\Delta\omega$ in the speed $\omega$ of the engine. When these variations exceed a preset limit, which is a function of $\Delta\omega/\omega$, unit 290 generates the signal $C_L$ which remains high as long as said limit remains exceeded. It has been explained above, in connection with FIG. 12, that whenever signal $C_L$ is present a single charge of fuel will be injected and ignited in each cylinder. If that cylinder was already in an active cycle, as explained, that ignition-charge was to be injected anyway so that appearance of signal $C_L$ does not make any difference. In conclusion, the cycles of those cylinders which were to be skipped without the signal $C_L$, now become active to provide a minimal power stroke. This results in a smoother torque and speed output at the time when "shaking" could have occurred.

It is readily apparent that various control parameters can be employed to attain different elements of control. Specifically, it will be apparent that several possibilities exist employing different combinations of engine combustion patterns and numbers of elementary charges of fuel per combustion. The system disclosed above accordingly is merely exemplary of these control parameters. In view of such variations; the single system set forth herein is deemed to be merely illustrative and in that regard the scope hereof shall be deemed in accordance with the claim as set forth below.

What is claimed is:

1. A method of operating a multiple cylinder, internal-combustion engine, comprising the steps of:
   storing a plurality of output-torque code words;
   providing a signal to indicate a desired level of output torque for said engine;
   selecting at least a pair of said code words under control of said signal indicative of desired output torque;
   developing at least said select pair of said code words to obtain specific combustion patterns for said engine, representative of actuation patterns to selectively burn fuel in the cylinders of said engine to provide different levels of output torque;
   generating a series of actuating pulses coinciding to said combustion patterns; and
   applying said actuating pulses to said engine to selectively actuate combustion events in each of said cylinders.

2. A method according to claim 1 further including the step of incrementally varying the quantity of fuel burned in said cylinders during each of said combustion events.

3. A control system for providing a desired pattern of combustion events in the cylinders of an internal-combustion engine for actuating pistons therein, comprising:
   pulse controlled means for initiating fuel injection and combustion in said cylinders of said engine in response to actuating pulses to provide desired combustion patterns;
   pulse means for providing timing pulses synchronized with the movement of said pistons to define the cycles of said engine; and
   gating means coupled to said pulse controlled means for receiving said timing pulses to selectively suppress and pass said timing pulses in said desired pattern, said gating means including means to pass all of a first plurality of timing pulses as defined by a first predetermined number, and means to pass alternate pulses of a second plurality of timing pulses as defined by a second predetermined number and means for combining said first plurality of timing pulses and said second plurality of timing pulses to provide said actuating pulses in accordance with said predetermined pattern.

4. A control system according to claim 3 including also means to invert said patterned sequence of timing pulses by replacing all pulses with voids and all voids with pulses, to result in a complementary sequence.

5. A control system according to claim 3 wherein storage means store several pairs of said first and second numbers to generate pairs of first and second binary words representing said numbers upon command by a signal which indicates the numeric address of the desired combustion pattern.

6. A control system according to claim 5 wherein combining means select said numeric address of a combustion pattern according to the momentary output conditions of the engine and to a manually encoded signal which indicates the torque commanded from the engine.

* * * * *